United States Patent [19]

Focqueur et al.

[11] Patent Number: 4,828,533

[45] Date of Patent: May 9, 1989

[54] DAMPER-TYPE FLYWHEEL SUITABLE FOR TORQUE TRANSMISSION DEVICES

[75] Inventors: Hervé Focqueur, Franconville; Bernard Jumel, Pierrefitte; Michel Blard, Issy-les-Moulineaux, all of France

[73] Assignee: VALEO, Paris, France

[21] Appl. No.: 63,099

[22] Filed: Jun. 17, 1987

[30] Foreign Application Priority Data

Jun. 19, 1986 [FR] France ................. 86 08835
Apr. 8, 1987 [FR] France ................. 87 04954

[51] Int. Cl.$^4$ ................. F16D 3/12; F16D 3/80
[52] U.S. Cl. ................. 464/24; 74/574; 192/58 B; 464/68
[58] Field of Search ............ 74/574; 192/58 B, 106.2; 464/24, 27, 28, 64, 66, 68

[56] References Cited

U.S. PATENT DOCUMENTS

| | | | |
|---|---|---|---|
| 1,749,554 | 3/1930 | Wichert | 464/66 |
| 3,464,233 | 9/1969 | Brouwers | 464/101 |
| 3,575,269 | 4/1971 | Sherman | 464/24 X |
| 3,823,619 | 7/1974 | Shotwell | 74/574 |
| 3,907,079 | 9/1975 | Chapman | 192/58 B X |
| 3,978,952 | 9/1976 | Hall | 464/24 |
| 4,071,252 | 1/1978 | Gillespie | 464/24 X |
| 4,173,158 | 11/1979 | Geislinger | 74/574 |
| 4,208,928 | 6/1980 | Conseur et al. | 74/574 |
| 4,274,524 | 6/1981 | Nakane | 464/68 X |
| 4,368,807 | 1/1983 | McLean et al. | 74/574 X |
| 4,370,900 | 2/1983 | Hartz | 74/574 |

FOREIGN PATENT DOCUMENTS

| | | |
|---|---|---|
| 0108393 | 5/1984 | European Pat. Off. . |
| 0169024 | 1/1986 | European Pat. Off. . |
| 2640752 | 4/1978 | Fed. Rep. of Germany ........ 74/574 |
| 3322374 | 1/1985 | Fed. Rep. of Germany . |
| 3329420 | 2/1985 | Fed. Rep. of Germany ........ 464/24 |
| 3610127 | 12/1986 | Fed. Rep. of Germany . |
| 1375156 | 9/1964 | France . |
| 2268186 | 11/1975 | France . |
| 2554891 | 5/1985 | France . |
| 2036925 | 7/1980 | United Kingdom .................. 464/66 |
| 2175067 | 11/1986 | United Kingdom ............. 192/106.2 |

OTHER PUBLICATIONS

Automotive Engineering, vol. 93, No. 1, Jan. 1985, p. 85, Dallas, Tex., U.S.; J. Yamaguchi: "Flywheel damper reduces low speed diesel noise and vibrations" p. 85, lignes 13-23.

Patent Abstracts of Japan, vol. 5, No. 25 (M-55) 697, Feb. 14, 1981; & JP-A-55 152 943 (Daikin Seisakusho K.K.) 28.11.1980.

Primary Examiner—Daniel P. Stodola
Attorney, Agent, or Firm—Charles E. Brown; Charles A. Brown

[57] ABSTRACT

A damper-type flywheel comprises two coaxial parts adapted to rotate relative to each other about their common axis. A circumferentially acting spring device is operatively disposed between the two coaxial parts. An annular fluid-tight cavity is defined between the two coaxial parts. A viscous damper device accommodated in the fluid-tight cavity is mechanically disposed between the two coaxial parts. The viscous damper device may comprise two groups of fins in the annular cavity each constrained to rotate with a respective one of the two coaxial parts, the annular cavity containing a viscous, preferably non-Newtonian fluid such as a silicone-based fluid.

20 Claims, 6 Drawing Sheets

DAMPER-TYPE FLYWHEEL SUITABLE FOR TORQUE TRANSMISSION DEVICES

BACKGROUND OF THE INVENTION

1. Field of the Invention

The invention concerns a damper-type flywheel, for instance a damper-type flywheel for a torque transmission device such as an automotive vehicle friction clutch; it is more particularly concerned with a flywheel of this type incorporating vibration damping means.

2. Description of the Prior Art

It is usual to insert torsional damper means at some point in the kinematic system constituted by transmission mechanisms which, in an automotive vehicle, extend from the motor to the wheel axles, in order to filter out vibrations that can arise anywhere along this kinematic system, in particular vibration due to the acyclic operation of the motor.

Such damper means are usually provided within the friction disk of the clutch.

However, it has already been proposed to incorporate such damper means in the flywheel fixed to the crankshaft of the motor and constituting the reaction plate of the clutch. This arrangement is particularly advantageous on a vehicle where it is necessary to minimize the noise occurring under load. A device of this kind is described in German patent application No. P 29 31 423, for example. The damper-type flywheel described in this document comprises two coaxial parts disposed to rotate relative to each other and between which are provided, on the one hand, circumferentially acting springs bearing at their ends against abutment means provided on the respective parts and, on the other hand, friction means. A system like this can give advantageous results in practice, especially in the case of the applications mentioned hereinabove, by virtue of the fact that the second and heavier part of the flywheel is on the output side of the spring and friction means within the kinematic system. Better filtering of vibration results from this. However, the coupling between the two parts of the flywheel is mechanically complex, especially because of the dry friction means, which are usually of two types. Firstly, there are friction means operative as soon as relative angular displacement occurs between the aforementioned two coaxial parts, and then there are friction means which become operative for a relatively high torque and in fact constitute a torque limiter.

The invention proposes a filter arrangement that is both simpler and more effective, utilizing damper means differing from those mentioned hereinabove. Generally speaking, the invention proposes to achieve the filtering effect by combining the action of circumferentially acting spring means with viscous damper means.

SUMMARY OF THE INVENTION

The invention consists in a damper type flywheel comprising two coaxial parts adapted to rotate relative to each other about their common axis, circumferentially acting spring means operatively disposed between the two coaxial parts, an annular fluid-tight cavity defined between the two coaxial parts and a viscous damper device mechanically disposed between the two coaxial parts within the fluid-tight cavity.

The viscous damper device preferably comprises two groups of fins in the annular cavity each constrained to rotate with a respective one of the two coaxial parts and the annular cavity preferably contains, in use, a viscous fluid, preferably of the non-Newtonian type. Depending on the embodiment concerned, the fins may be disposed in parallel planes perpendicular to the aforementioned common axis or in radial planes including that axis. Relative movement of the fins in the two groups within the cavity filled with the viscous fluid achieves the required damping effect. Moreover, the circumferentially acting spring means may conventionally consist in the usual type helical coil springs regularly disposed in the circumferential direction between abutment members on the aforementioned two coaxial parts. However, these springs may advantageously be replaced by at least one elastomer material disk disposed between and fastened to the coaxial parts. The elastomer material disk serving as the circumferentially acting spring means is advantageously made from a grade of material whose self-damping characteristics are relatively low as compared with those of the viscous damper device to provide better decoupling between the spring means and the damper device.

With regard to the damping in particular, use is preferably made, as mentioned hereinabove, of a fluid characterized by a viscosity that is highly stable as a function of temperature and a dynamic viscosity which reduces as a function of the shear speed gradient so as to procure for increasing frequencies less damping than would be procured by a "Newtonian" fluid. Silicone-based fluids and gels provide a satisfactory solution to the requirements as defined hereinabove. This fluid is throttled inside the previously mentioned annular cavity by the relative movement of the two groups of fins, this throttling producing the required damping. One of the groups of fins is preferably mounted with circumferential clearance on the corresponding part of the flywheel so as to cancel their damping effect at high frequencies, where the amplitude of vibration is less than this clearance.

The part of the flywheel which is more downstream in the aforementioned kinematic system may advantageously constitute the reaction plate of the clutch.

A further developement of the invention concerns a damper-type flywheel as defined hereinabove comprising two coaxial parts disposed to rotate relative to each other by means of a bearing placed between them and comprising a dry friction torque limiter disposed between the coaxial parts.

Among other advantages, the torque limiter fulfills not only its main function as a safety device by permitting relative slipping between the two coaxial parts whenever the torque transmitted exceeds a predetermined maximum value, but also makes it possible to avoid bruising of the rolling track by modifying the position of the balls between the bearing races.

The invention will be better understood and its other advantages will emerge more clearly from the following description of a number of damper-type flywheels according to the invention, given by way of example only and with reference to the appended non-limiting drawings.

DESCRIPTION OF THE PREFERRED EMBODIMENTS

Figure 1:
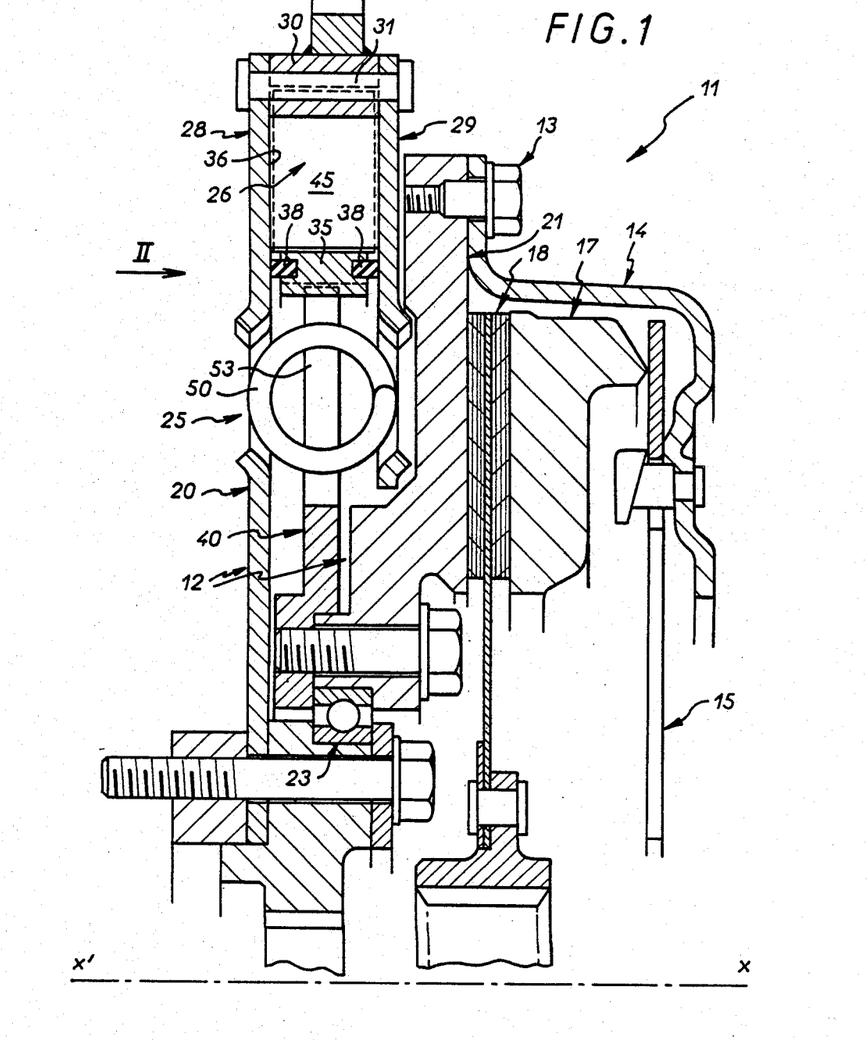
FIG. 1 is a partial half-section through a clutch including a damper-type flywheel in accordance with the invention used as a reaction plate.
Figure 2:
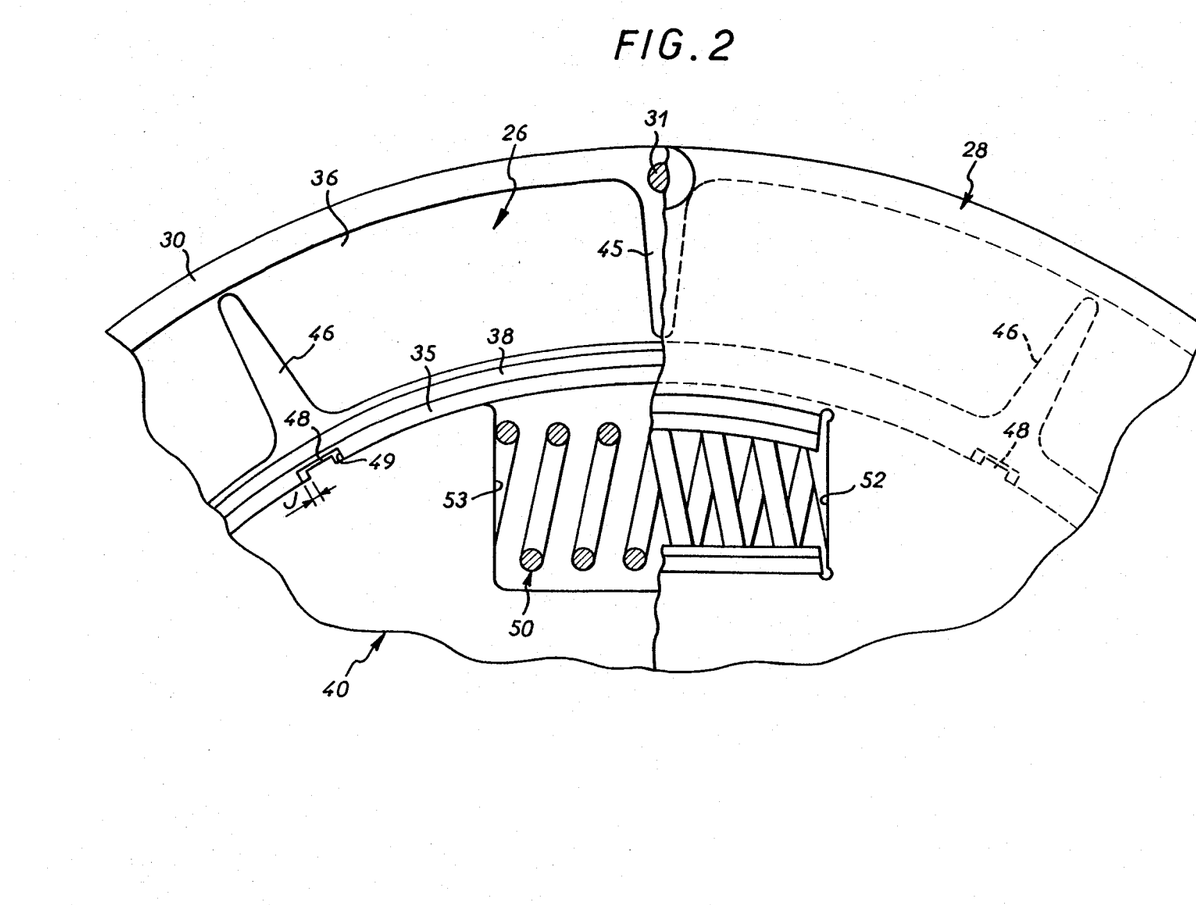
FIG. 2 is a partially cut away view in the direction of the arrow II in FIG. 1.

Referring to FIGS. 1 and 2 in particular, there is shown part of a friction clutch 11 essentially consisting of a damper-type flywheel 12 forming also the reaction plate of the clutch, a stamped sheet metal annular part 14 usually called the clutch cover, a clamping and release member 15 in the form of a diaphragm spring, a pressure plate 17 and a friction disk 18. The damper-type flywheel 12 is fastened to a driving shaft (not shown) such as the crankshaft of a motor. The cover 14 is fixed to the flywheel by screws 13 and, in the conventional way, encloses the diaphragm 15, the pressure plate 17 and the friction disk 18. During a clutch engaging maneuver the diaphragm 15 is adapted to deform and to urge into the engaged position the pressure plate 17 which is constrained to rotate with the cover but can move axially relative to the cover, towards the reaction plate. The friction disk 18, which is constrained to rotate with a driven shaft (not shown), is disposed axially between the reaction plate and the pressure plate so that it can be clamped between them due to the action of the diaphragm. The previously mentioned driving shaft and driven shaft have a common axis x'x.

The damper-type flywheel comprises two coaxial parts 20 and 21 disposed to rotate relative to each other about their common axis x'x, a first part 20 fixed to the driving shaft and a heavy second part 21 mounted on the first part 20 through the intermediary of a ball bearing 23, this second part forming the reaction plate of the clutch. The first part 20 accommodates circumferentially acting spring means 25 and a viscous damper device 26. The spring means 25 and the device 26 are both mechanically inserted between the coaxial parts 20 and 21. With specific reference to the viscous damper device in FIGS. 1 and 2, the first part 20 of the flywheel comprises two flange disks 28 and 29 perpendicular to the axis x'x and held apart and parallel to each other by an outer annular spacer 30 carrying the starter ring, and to which they are fixed by means of bolts 31, rivets or the like, passing through holes formed in the thickness of the spacer. This assembly defines, together with an inner ring 35, a fluid-tight annular cavity 36 within which is confined the viscous damper device 26. The inner ring 35 comprises two lateral circular grooves formed in its axial ends and accommodating seals 38 in contact with respective facing surfaces of the flange disks 28, 29. The ring 35 is rotationally coupled to the second part 21 of the flywheel, to be more precise to a disk-shaped central core 40 screwed onto the part 21.

As FIG. 2 clearly shows, the viscous damper device 26 comprises, inside the fluid-tight annular cavity 36, two groups of fins respectively constrained to rotate with the coaxial parts 20 and 21, the annular cavity 36 containing a "non-Newtonian" viscous fluid as previously defined. The fins lie in radial planes passing through the common axis x'x and the arrangement is such that any fin of either group is interleaved circumferentially between two fins of the other group. Thus there is a first group of fins 45 cast in one piece with the inside wall of the annular spacer 30 and projecting radially inwards relative to the latter into the cavity 36 and there is a second group of fins 46 cast in one piece with the outer wall of the inner ring 35 and projecting radially outwards relative thereto, into the same cavity 36. The edges of the fins are carefully spaced from the walls of the annular cavity so that the viscous fluid can be throttled on each side of the fins, in order to procure the necessary damping.

It should also be noted that the inner ring 35 is fitted with a predetermined circumferential clearance J onto a cylindrical surface on the second part 21. This cylindrical surface consists in the outside edge of the core 40. To this end, shaped linking members 48, 49 are disposed between the inner ring and the core. They comprise projections 48 at the periphery of the core 40 inserted into corresponding notches 49 defined in the inner wall of the ring 35, these notches being wider in the circumferential direction than the projections, to provide the previously mentioned clearance J.

In the embodiment of FIGS. 1 and 2 the circumferentially acting spring means 25 comprise a plurality of helical coil springs 50 operative in compression regularly disposed in the circumferential direction between abutment members forming part of the coaxial parts 20 and 21, respectively. Each spring 50 bears on the one hand against radial edges 52 defined along the length of openings formed in the flange disks 28 and 29 to accommodate the spring and, on the other hand, against a bearing surface 53 of the core 40 defined by the edge of a notch in the latter within which the spring is mounted.

In operation vibrations are damped by the combined action of the viscous damper device and the circumferentially acting spring means, that is to say by variations in the compression of the springs and by relative angular movement between the fins of the two groups inside the annular cavity. For low-frequency oscillations, which are of relatively large amplitude, virtually all of the movement of the fins 46 is communicated to the core 40, in other words to the second part 21, the previously mentioned clearance J being negligible as compared with the amplitude of the oscillations. Thus for low-frequency vibrations the fins 46 are effectively constrained to rotate with the second part 21 and the oscillation is filtered by the circumferentially acting spring means and by the viscous damper device.

On the other hand, the clearance J disables the viscous damper device when the vibrations to be damped are at a high frequency (around 50 Hz and above, for example) and therefore of relatively low amplitude, less than the clearance J, which results in the viscous damper device being decoupled from the second part 21. Thus the viscous damper device is no longer operative above a frequency threshold determined by the value of the clearance J. As a result, at low frequencies the viscous damping predominates but at high frequencies the damping effect is slight and the oscillation is essentially filtered by the circumferentially acting spring means.

Figure 3:
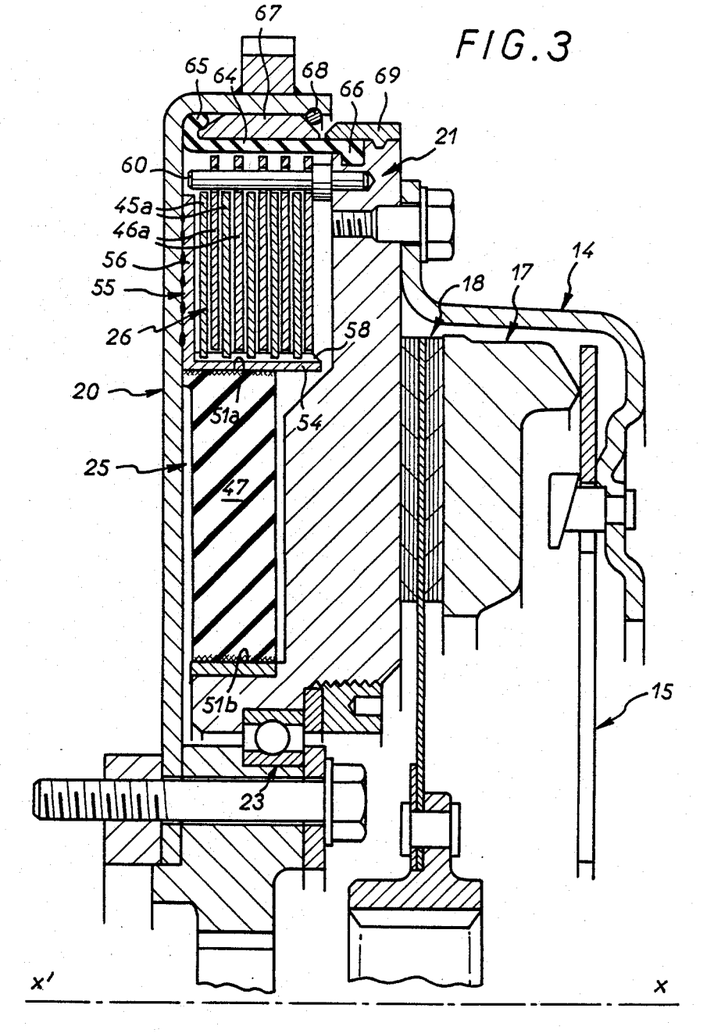
FIG. 3 is a view analogous to FIG. 1 and showing an alternative embodiment.
Figure 4:
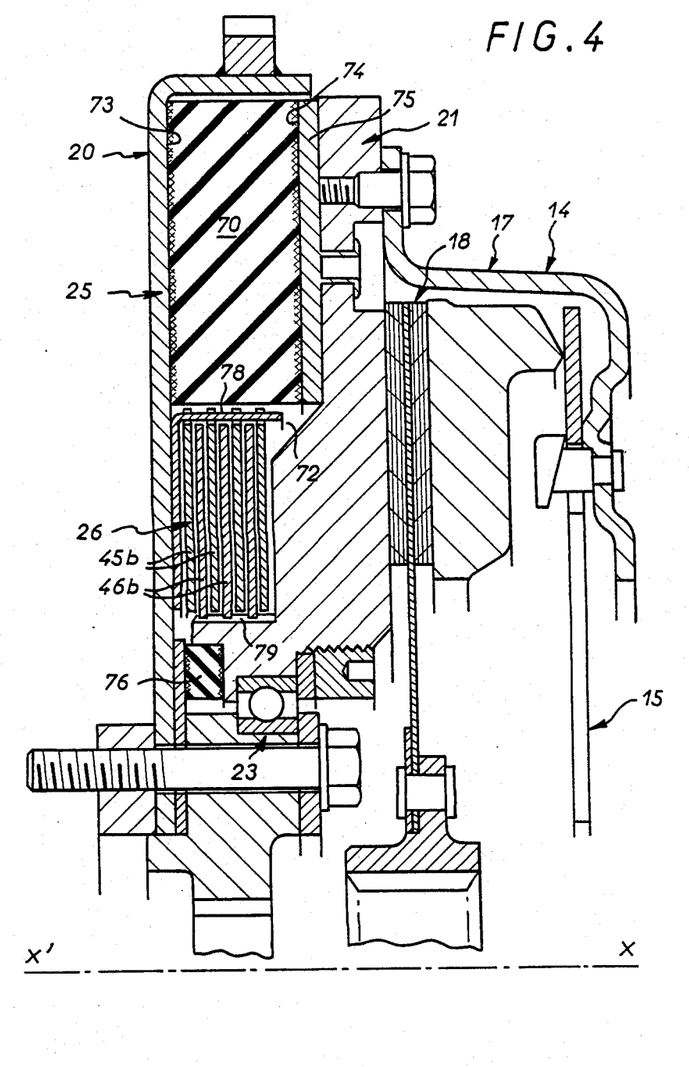
FIG. 4 is another view analogous to FIG. 1 and showing a further embodiment.

In the embodiment of FIGS. 3 and 4 structural members analogous to those of FIG. 1 carry the same reference numbers and will not be described again. In the FIG. 3 embodiment the circumferentially acting spring means 25 consist of a thick elastomer material disk 47 with low inherent damping having its outside cylindrical surface 51a and inside cylindrical surface 51b adhesively bonded to corresponding cylindrical bearing surfaces on the first part 20 and the second part 21, respectively. The disk 47, being constrained to rotate with each of the parts 20 and 21, is therefore operative in torsion. The cylindrical bearing surface 54 to which is fixed the cylindrical surface 51a of the disk 47 is part of an annular member 55 which has an L-shaped cross-section and is attached by its radial surface 56 to the first part 20. On the cylindrical bearing surface 54 are longitudinal indentations 58 forming splines and establishing the rotational coupling between the fins 45a of the first group and this cylindrical bearing surface 54, and thus the first part 20. In this embodiment the fins 45a and 46a of the two groups defining the viscous damper device are in the form of annular disks and are disposed in parallel planes perpendicular to the axis x'x. The fins of the two groups are interleaved axially. The fins 45a comprise at their inside periphery notches corresponding to the longitudinal indentations 58 and these shaped linking members between the fins 45a and the cylindrical bearing surface 54 are exploited to implement the same circumferential clearance J as in the previous example. To achieve this the notches in the fins 45a merely have to be wider than the corresponding indentations 58. The fins 46a have holes in their outside edge and are fitted over rods 60 parallel to the axis x'x fastened to the second part 21. The clearance J could of course be provided between the fins 46a and these rods 60. The annular cavity 36 containing the non-Newtonian viscous fluid is sealed at the inside by the disk 47 itself and at the outside by a ring 64 of elastomer material comprising circular beads 65, 66. The bead 65 is clamped between the first part 20 and a ring 67 fixed inside a cylindrical bearing surface on the first part 20 by a ring 68. The bead 66 is inserted in a groove in the second part 21 and immobilized there by an outer ring 68. Thus the ring 64 is operative in shear.

In the FIG. 4 embodiment the elastomer material disk 70 forming the circumferentially acting spring means 25 is disposed radially outside the annular cavity 72 containing the viscous damper device 26. The disk 70 has its axial end surfaces 73 and 74 adhesively bonded respectively to the first part 20, directly, and to the second part 21, through the intermediary of an annular base member 75 riveted to the latter. The disk 70 is thus operative in shear and also serves to seal the cavity 72 at its outside edge. The inside edge of the cavity is sealed by an elastomer material ring 76 also adhesively bonded to the coaxial parts 20 and 21.

In the viscous damper device, the fins 45b of the first group are constrained to rotate with a cylinder 78 fixed to the first part 20 and the fins 46b of the second group are provided at their inside periphery with notches engaged with clearance J with longitudinal indentations 79 formed on a cylindrical section of the second part 21.

Figure 5:
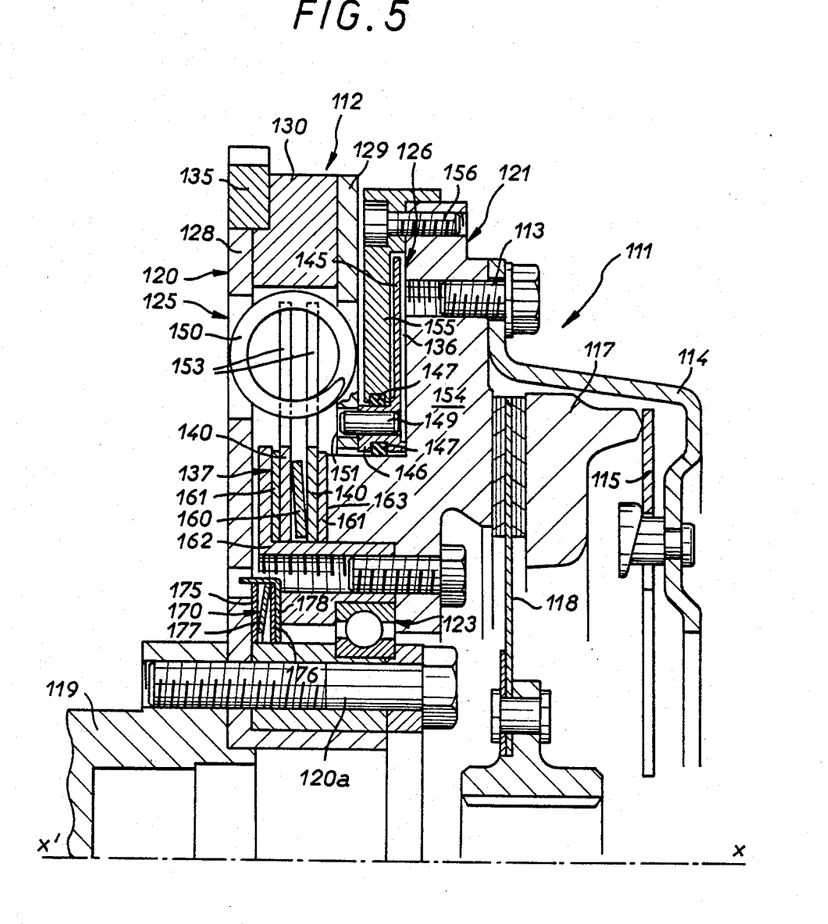
FIG. 5 is a half-section in elevation of another friction clutch incorporating a damper-type flywheel in accordance with the invention.

FIG. 5 shows part of a friction clutch 111 essentially consisting of a damper-type flywheel 112 which also forms the reaction plate of the clutch, a stamped sheet metal annular part 114 usually called the clutch cover, a clamping and release member 15 in the form of a diaphragm spring, a pressure plate 117 and a friction disk 118. The damper-type flywheel 112 is fastened to a driving shaft 119, such as the crankshaft of a motor. The cover 114 is fixed by screws 113 to the flywheel and in the conventional way accommodates the diaphragm 115, the pressure plate 117 and the friction disk 118. During a clutch engagement maneuver the diaphragm 115 is adapted to deform and urge into an engaged position the pressure plate 117 which is constrained to rotate with the cover but able to move axially relative to the cover, towards the reaction plate. The friction disk 118, constrained to rotate with a driven shaft (not shown) such as the input shaft of the gearbox, is disposed axially between the reaction plate and the pressure plate so that it can be clamped between them by the diaphragm. The previously mentioned driving shaft and driven shaft have a common axis x'x.

The damper-type flywheel comprises two coaxial parts 120, 121 disposed to rotate relative to each other about their common axis x'x, a first part 120 fixed to the driving shaft by screws 120a and a heavier second part 121 mounted on the first part 120 through the intermediary of a ball bearing 123, this second part forming the reaction plate of the clutch. The first part 120 accommodates circumferentially acting spring means 125. These are mechanically disposed between the coaxial parts 120 and 121. The part 120 of the flywheel comprises two flange disks 128, 129 perpendicular to the axis x'x and held parallel to and spaced from each other by an outer spacer 130 to which they are attached by means of bolts, rivets or the like passing through holes formed in the spacer. The flange 128 carries the starter ring 135. The circumferentially acting spring means 125 comprise a plurality of helical coil springs 150 operative i compression and regularly disposed in the circumferential direction between abutment members forming parts of the coaxial parts 120 and 121, respectively. Each spring 150 bears, on the one hand, on substantially radial edges defined along openings formed in the flange disks 128 and 129 to accommodate the spring and, on the other hand, against two bearing surfaces 153 of two parallel flange plates 140. The flange plates 140 are part of the second part 121 and are normally constrained to rotate with the latter through the intermediary of a dry friction torque limiter 137 functionally disposed between the two coaxial parts 120 and 121 and to be described in more detail later. The damper-type flywheel further comprises a viscous damper device 126 confined in a cavity 136 essentially defined in the second of the coaxial parts. This cavity extends to the vicinity of the outside edge of the second part 121 and is essentially delimited by two disks 154 and 155 of the second part 121. The disk 154 also forms the reaction plate of the clutch. The disk 155 features an external shoulder by means of which it is applied against and fixed in a fluid-tight way by means of screws 156 to the disk 154. The cavity 136 thus defined in the driven part of the damper-type flywheel accommodates an annular disk-shaped fin 145 perpendicular to the common axis x'x of the two coaxial parts 120, 121. By increasing the axial length of the cavity it would be possible to provide a plurality of fins interleaved with other fins fastened to the second part 121, as described with reference to FIGS. 1 through 4 and as will be described with reference to FIG. 6. In the present example, however, given the arrangement of the fin at the outside periphery of the device, a single fin is sufficient. This fin 145 is coupled with circumferential clearance to that of the coaxial parts which does not comprise the cavity 136, in other words the first part 120. To this end the fin is fastened at least in the rotational sense to an annular hub 146 forming a mobile part of the cavity. The fin comprises a hub of this kind in its innermost part. The hub is able to rotate relative to the remainder of the cavity, sealing being provided by two coaxial O-rings 147. The cavity contains a non-Newtonian type viscous fluid, as defined hereinabove. The hub 146 comprises a peg 149 parallel to the axis x'x and inserted with circumferential clearance in an opening 151 formed in the flange 129 of the first part 120. The circumferential clearance is provided by the shape of the opening 150, which is elongate in the circumferential direction, although this is not visible from the figures.

The torque limiter 137 comprises flange plates 140, spring means 160 forming a Belleville spring washer disposed between the flange plates and two friction rings 161. These are respectively disposed between the flange plates and an annular bearing surface formed on one of the component parts of the second part, to be more precise, on the one hand an annular flange 162 also serving to secure the outer race of the bearing 123 and, on the other hand, an annular bearing surface 163 on the reaction plate 154. The spring means 160 are adapted to push the flange plates apart and to urge them respectively towards the previously mentioned annular bearing surfaces through the intermediary of friction rings 161. The magnitude of the axial clamping force developed is such that the flange plates continue to be constrained to rotate with the second part 121 provided that the torque applied to the flange plates remains below a predetermined value.

The damper type flywheel further comprises additional dry friction means 170 operative as soon as relative angular displacement between the coaxial parts 120, 121 begins and mechanically disposed between them, so as to introduce some degree of hysteresis into the functioning of the device when the torque changes direction. This arrangement will not be described in detail, as it is known per se. In outline, it comprises two bearing washers 175, 176 between which are axially disposed a Belleville spring washer 177 and a friction ring 178 urged against a bearing surface on the flange 162 by the Belleville washer 177, the bearing ring 175 being pressed against the flange disk 128.

The system that has just been described gives good results principally because the hysteresis inherent to the viscous damper device is proportional to the relative speed of the two coaxial parts. The characteristics also merge smoothly between the two hysteresis ranges, associated with the friction means 170 and associated with the viscous damping device. If the viscous damper device hysteresis operating threshold is slightly exceeded there is no sudden jump in the hysteresis that could cause any shock or bounce since the hysteresis is related to the difference in the speeds of the two coaxial parts, as already mentioned. Beyond this the hysteresis due to the viscous damper device is needed and procures a higher value than could be obtained by another dry friction device.

Figure 6:
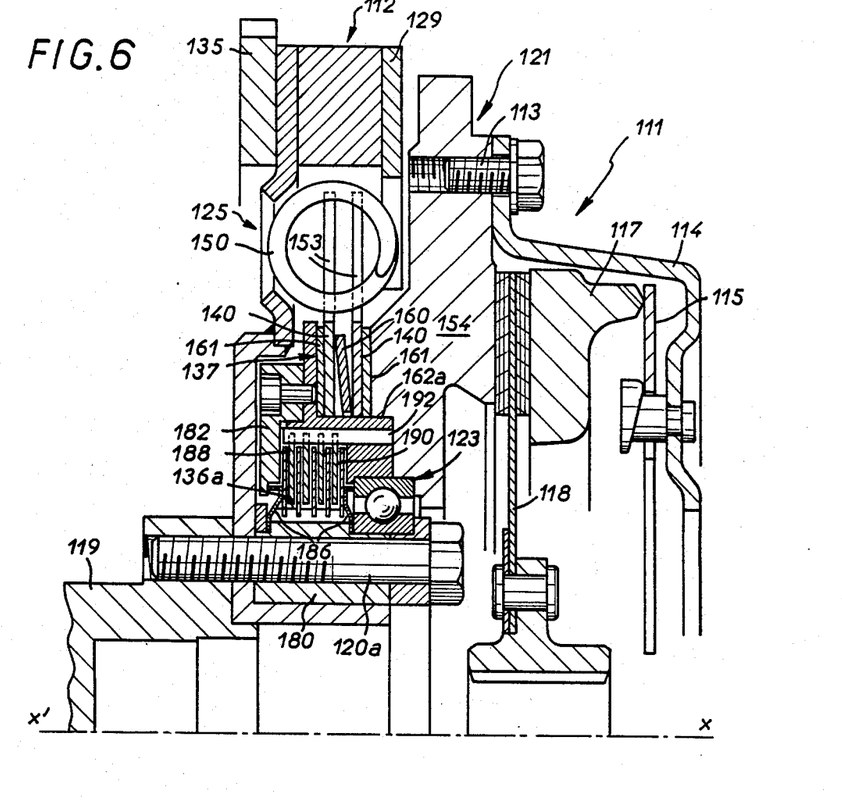
FIG. 6 is a view analogous to FIG. 5 and showing another embodiment.

In the FIG. 6 embodiment analogous parts carry the same reference numbers as in FIG. 5 and will not be described again. In this embodiment the cavity 136a is essentially delimited between the outside surface of a hub 180 fastened to the first coaxial part 120 and a set of annular flanges 162a, 182 fixed to the second coaxial part 121. Sealing means are provided between the hub 180 and the set of flanges 162a, 182. These consist of profiled spring rings 186, known per se, clamped axially and in a fluid-tight way against respective shoulders on the hub 180. The shoulders are at the axial ends of the cavity 136a. The respective outside edges of the rings 186 bear on circular areas on members which form part of or are fastened to the cavity 136a. To be more precise, one of the rings 186 bears against a circular shoulder on the flange 182 while the other bears on the outer race of the bearing 123. As in FIG. 5, the flange 162a carries at the outside a flat annular extension defining part of the torque limiter 137. The cavity 136a accommodates annular disk-shaped fins perpendicular to the axis x'x. A first group of fins 188 is constrained to rotate with the hub 180, that is to say with the first part 120 (by virtue of splines carried by the hub) and a second group of fins 190 is constrained to rotate with the other coaxial part, namely the part 121; the fins in the two groups are interleaved axially. The fins 190 of the second group are coupled rotationally to the flange 162a by means of one or more pins 192 inserted into holes in the corresponding fins. Circumferential clearance may be provided between the fins of a group and the coaxial part with which they are constrained to rotate. This clearance could be provided, for example between the crescent-shaped holes (not visible in the drawings) that the fins 190 comprise and the pins 192. It should also be noted that in an arrangement of this kind the fins of one group can be coupled to the aforementioned coaxial part with different values of clearance, so that the hysteresis characteristic of the viscous damper device can be varied at will. This is possible with the FIG. 5 embodiment, of course, when the cavity contains more than one fin.

Figure 7:
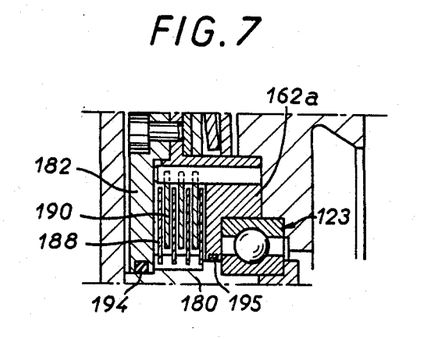
FIG. 7 is a detailed view showing a modification to the embodiment from FIG. 6.

The FIG. 7 embodiment differs from that of FIG. 6 only in the nature of the means used to seal the cavity 136a. In this embodiment O-rings 194, 195 are accommodated in respective grooves on the flanges 182 and 162a and lie between these flanges and the hub 180.

It is to be understood that the invention is not limited to the few embodiments that have just been described. Specifically, the viscous damping device from FIG. 1 or any other arrangement fulfilling the same function may be associated with an elastomer material disk operative in torsion as in FIG. 3 or in shear as in FIG. 4. On the other hand, the viscous damping arrangement described with reference to FIGS. 3 or 4 may be combined with circumferentially acting spring means of the kind described with reference to FIG. 1. In other words, the invention encompasses all technical equivalents of the means employed within the scope of the appended claims.

There is claimed:

1. Damper-type flywheel comprising two coaxial parts adapted to rotate relative to each other about their common axis, circumferentially acting spring means operatively disposed between said two coaxial parts, an annular fluid-tight cavity defined between said two coaxial parts and a viscous damper device mechanically disposed between said two coaxial parts within said fluid-tight cavity, said viscous damper device comprising two groups of fins in said annular cavity each constrained to rotate with a respective one of said two coaxial parts and said annular cavity containing, in use, a viscous fluid, and shaped linking members associated with each coaxial part coupling said groups of fins for rotation with the respective coaxial part, at least one of said groups of fins being coupled to its respective coaxial part with a predetermined circumferential clearance.

2. Flywheel according to claim 1, wherein said viscous fluid is a non-Newtonian fluid.

3. Flywheel according to claim 2, wherein said viscous fluid is a silicone-based fluid.

4. Flywheel according to claim 1, comprising two disks perpendicular to said common axis forming part of a first of said coaxial parts and delimiting said annular cavity, an outer annular spacer to which said two disks are fastened by which they are held at a distance from each other and an inner ring by which said two disks are held at a distance from each other, constrained to rotate with the second of said two coaxial parts, disposed inside said annular spacer and in fluid-tight contact with said two disks at its axial ends.

5. Flywheel according to claim 4, wherein said fins lie in radial planes passing through said common axis, a first group of fins projects radially inwards from said annular spacer and a second group of fins projects radially outwards from said inner ring, each fin of either group being disposed circumferentially between two fins of the other group.

6. Flywheel according to claim 1, wherein said fins are in the shape of annular disks and lie in parallel planes perpendicular to said common axis, a first group of fins is constrained to rotate with a first of said two coaxial parts, a second group of fins is constrained to rotate with the second of said two coaxial parts and the fins of said first and second groups are axially interleaved.

7. Flywheel according to claim 1, wherein said two coaxial parts comprise respective abutment members and said circumferentially acting spring means comprise a plurality of compression springs regularly disposed circumferentially between said abutment members.

8. Flywheel according to claim 1, wherein said circumferentially acting spring means comprise an elastomer material disk disposed between and constrained to rotate with said two coaxial parts.

9. Flywheel according to claim 8, wherein said two coaxial parts comprise respective cylindrical bearing surfaces to which external and internal cylindrical surfaces of said elastomer material disk are fixed, whereby said disk is operative in torsion.

10. Flywheel according to claim 8, wherein said two coaxial parts comprise respective surfaces facing towards each other to which opposite axial ends of said elastomer material disk are fixed, whereby said disk is operative in shear.

11. Flywheel according to claim 10, wherein said elastomer material disk forms one wall of said fluid-tight annular cavity.

12. Flywheel according to claim 1, further comprising a bearing and a dry friction torque limiter disposed between said two coaxial parts.

13. Flywheel according to claim 12, further comprising two disks forming part of one of said two coaxial parts, fastened together and delimiting said annular cavity which extends to the vicinity of the outside periphery of said one coaxial part.

14. Flywheel according to claim 13, further comprising a hub fastened to one of said two coaxial parts, a set of annular flanges fastened to the other of said two coaxial parts and sealing means between said hub and said set of annular flanges, wherein said cavity is at least in part delimited by an outside surface of said hub and said set of annular flanges.

15. Flywheel according to claim 14, wherein one of said annular flanges defines an outside cylindrical surface of said cavity and its outside is shaped to define part of said torque limiter.

16. Flywheel according to claim 14, further comprising annular disk-shaped fins perpendicular to said common axis and wherein a first group of said fins is constrained to rotate with one of said two coaxial parts, a second group of said fins is constrained to rotate with the other of said two coaxial parts and the fins of said first and second sets are axially interleaved.

17. Flywheel according to claim 16, wherein the fins of one of said groups are coupled to the coaxial part with which they are constrained to rotate with circumferential clearance.

18. Flywheel according to claim 17, wherein the fins of said one group are coupled to the coaxial part with which they are constrained to rotate with different values of circumferential clearance.

19. Flywheel according to claim 14, wherein said sealing means comprise O-rings disposed between said hub and said flanges and further comprising respective grooves accommodating said O-rings.

20. Flywheel according to claim 14, wherein said hub comprises a respective shoulder at each axial end of said cavity and said sealing means comprise shaped elastic rings clamped axially and in a fluid-tight way against respective shoulders and having outside edges adapted to bear elastically against circular parts of members which form part of or are fixed relative to said cavity.

* * * * *